United States Patent
Chiu (10) Patent No.: US 7,735,940 B2
(45) Date of Patent: Jun. 15, 2010

(54) VOLUME-ADJUSTABLE UNIT AND FURNITURE COMPRISING FRAME MADE OF THE SAME

(75) Inventor: Chi-Shen Chiu, No. 141-1, Chung-Cheng Rd., Tong-Shao Town, Miao-Li Hsien (TW)

(73) Assignees: Chi-Shen Chiu, Tong-Shao Town (TW); Fei Pi Lin, Taipei (TW)

( * ) Notice: Subject to any disclaimer, the term of this patent is extended or adjusted under 35 U.S.C. 154(b) by 1172 days.

(21) Appl. No.: 11/260,328

(22) Filed: Oct. 27, 2005

(65) Prior Publication Data
US 2007/0096609 A1    May 3, 2007

(51) Int. Cl.
*A47B 45/00* (2006.01)

(52) U.S. Cl. ...................... 312/205; 312/259

(58) Field of Classification Search ............... 312/205, 312/259
See application file for complete search history.

(56) References Cited

U.S. PATENT DOCUMENTS

| | | | |
|---|---|---|---|
| 3,237,136 A * | 2/1966 | Ford ........................... 336/205 |
| 3,296,059 A * | 1/1967 | Schwindt ..................... 428/12 |
| 3,303,075 A * | 2/1967 | Rabus ......................... 156/65 |
| 3,483,070 A | 12/1969 | Kennedy et al. |
| 3,606,460 A * | 9/1971 | Shannon .................. 297/450.1 |
| 4,095,384 A * | 6/1978 | Zarriello ...................... 52/408 |
| 4,124,260 A * | 11/1978 | Bergman ..................... 312/107 |
| 5,129,329 A * | 7/1992 | Clasen ....................... 108/51.3 |
| 5,575,574 A * | 11/1996 | Mertens .................... 400/118.2 |
| 5,899,422 A | 5/1999 | Eke .......................... 248/188.4 |
| 6,083,580 A * | 7/2000 | Finestone et al. ........... 428/34.2 |
| 6,352,605 B1 * | 3/2002 | Hunt .......................... 156/211 |
| 6,471,288 B2 | 10/2002 | Alexander, Jr. .............. 297/56 |
| 6,588,837 B1 | 7/2003 | Schultz et al. .............. 297/111 |

(Continued)

FOREIGN PATENT DOCUMENTS

GB    1036365    7/1966

(Continued)

OTHER PUBLICATIONS

Extended European Search Report dated Feb. 27, 2009 issued in European Patent Application No. 06021607.4, 6 pages.

*Primary Examiner*—Hanh V Tran
(74) *Attorney, Agent, or Firm*—Grossman, Tucker, Perreault & Pfleger, PLLC (57) ABSTRACT

A volume-adjustable unit including a first layer, a second layer, and multiple inner paper layers disposed between the first and second layers. Each inner paper layer has two opposing sides, and each of the two opposing sides is adhered to an adjacent layer of the each inner paper layer through an adhesive layer. The adhesive layer includes multiple adhesive strips which are substantially in parallel, are spaced apart from each other and are arranged in such a way that each section of the each inner paper layer adheres to at most one adjacent layer on one of the two opposing sides through an adhesive strip, whereby multiple hexagonal columns are formed by the inner paper layers as the unit is stretched-out. The unit can be used to prepare a volume-adjustable frame of a piece of light furniture and transported from one place to another in smaller volume.

14 Claims, 11 Drawing Sheets

U.S. PATENT DOCUMENTS

| | | | |
|---|---|---|---|
| 2003/0218365 A1 | 11/2003 | Kawiaka | 297/118 |
| 2004/0251726 A1 | 12/2004 | Alexander, Jr. | |
| 2005/0227032 A1* | 10/2005 | Pemberton | 428/40.1 |
| 2006/0049190 A1* | 3/2006 | Middleton et al. | 219/730 |
| 2007/0251943 A1* | 11/2007 | Wnek et al. | 219/730 |

FOREIGN PATENT DOCUMENTS

| | | | |
|---|---|---|---|
| GB | 2 125 284 | | 3/1984 |
| JP | 2003035021 | * | 2/2003 |
| TW | 526739 | | 4/2003 |

* cited by examiner

VOLUME-ADJUSTABLE UNIT AND FURNITURE COMPRISING FRAME MADE OF THE SAME

CROSS-REFERENCES TO RELATED APPLICATIONS

Not applicable.

STATEMENT REGARDING FEDERALLY SPONSORED RESEARCH OR DEVELOPMENT

Not applicable.

BACKGROUND OF THE INVENTION

1. Field of the Invention

The present invention relates to a volume-adjustable unit that can be processed to provide a frame of a piece of volume-adjustable furniture such as a chair, table, desk, bed, cabinet, bookcase, shelf, etc. Specifically, the present invention provides a piece of furniture with a volume-adjustable frame, substantially made of paper and with desired supporting strength. The frame can be reconfigured into different shapes as desired without permanent deformation.

2. Descriptions of the Related Art

Currently, most pieces of furniture are made of metals, woods, or a combination thereof, to satisfy supporting requirement. Furniture made of metal and/or wood is heavy and has a fixed shape. Normally, such furniture is shipped fully assemble, taking up more space and therefore, adding transportation costs. Alternatively, such furniture is taken apart into its elements before transportation, and then reassembled after being transported to its destination. Therefore, furniture that is light and has an adjustable volume is highly desired for easy and cost-saving transportation purposes.

Various approaches have been developed for providing a piece of furniture with an adjustable configuration. However, most approaches have focused either on the adjustment of height or length of the furniture or the angle of one element relative to another element.

For instance, GB 2 125 284 A discloses furniture item, such as a chair, with synchronous movement of back and seat comprising a stationary frame, a seat support pivotably connected to the frame at a first pivot, and a gas cylinder and piston rod pivotably connected to the frame at a second pivot and the seat support at a third pivot. Adjustment of the angle of the seat support relative to the frame automatically adjusts the angle of the back relative to the seat support in a predetermined ratio.

U.S. Pat. No. 5,899,422 provides an adjustable furniture leg extension device for use in raising the height of a piece of furniture, such as a chair, table, or bed. U.S. Pat. No. 6,471,288 B2 relates to a folding chair having adjustable rear legs for use on flat, even ground and in addition, on sloping terrain from about zero to twenty degrees and being continuously adjustable over this range by a user in a seated position. US2003/0218365A1 discloses a single piece of furniture that is convertible to a number of different pieces of furniture, including a chair, desk, table and bed, shelves, and many other furniture types. This piece of furniture is made of wood, plastic, or metal, and does not have a curve shape. U.S. Pat. No. 6,588,837 relates to a chair that is adapted to form a sitting surface and a sleeping surface and comprises a chair back and a seat. The chair back and seat are relatively movable to form the sitting surface and the sleeping surface. US 2004/0251726A1 provides a folding chair having adjustable, telescoping rear legs for use on level ground and sloping terrain. The chair is continuously adjustable by a user while in a seated position, with each of the telescoping rear legs housing a biasing means to mechanically assist the user in their adjustment.

None of the aforementioned approaches are directed to a piece of furniture comprising a frame substantially made of paper, the frame would be volume-adjustable and can be reconfigured without permanent deformation.

BRIEF SUMMARY OF THE INVENTION

The primary object of this invention is to provide a volume-adjustable unit. The unit comprises a first layer, a second layer, and multiple inner paper layers subsequently disposed between the first and second layers through a unique arrangement that allows for the adjustment of the volume of the unit, as well as the stretching of the unit to form multiple hexagonal columns that provide the desired support.

Another object of this invention is to provide a piece of furniture. The furniture comprises a frame made of the unit of the present invention. The frame is volume-adjustable and can be reconfigured without permanent deformation. Because the frame of the furniture is made of a unit that is substantially made of paper and is volume-adjustable, the furniture is relatively light and can be transported from one place to another without taking up a lot of space.

Further objects and advantages for the present invention will become apparent from a consideration of the drawings and ensuing description. The detailed technology and preferred embodiments implemented for the subject invention are described in the following paragraphs accompanying the appended drawings The detailed technology and preferred embodiments implemented for the subject invention are described in the following paragraphs accompanying the appended drawings for people skilled in this field to well appreciate the features of the claimed invention.

DETAILED DESCRIPTION OF THE INVENTION

The present invention provides a volume-adjustable unit. The unit comprises a first layer, a second layer, and multiple inner paper layers subsequently disposed between the first and second layers through a unique arrangement that allows for the adjustment of the volume of the unit, as well as the stretching of the unit to form multiple hexagonal columns that provide the desired support.

Figure 1A:
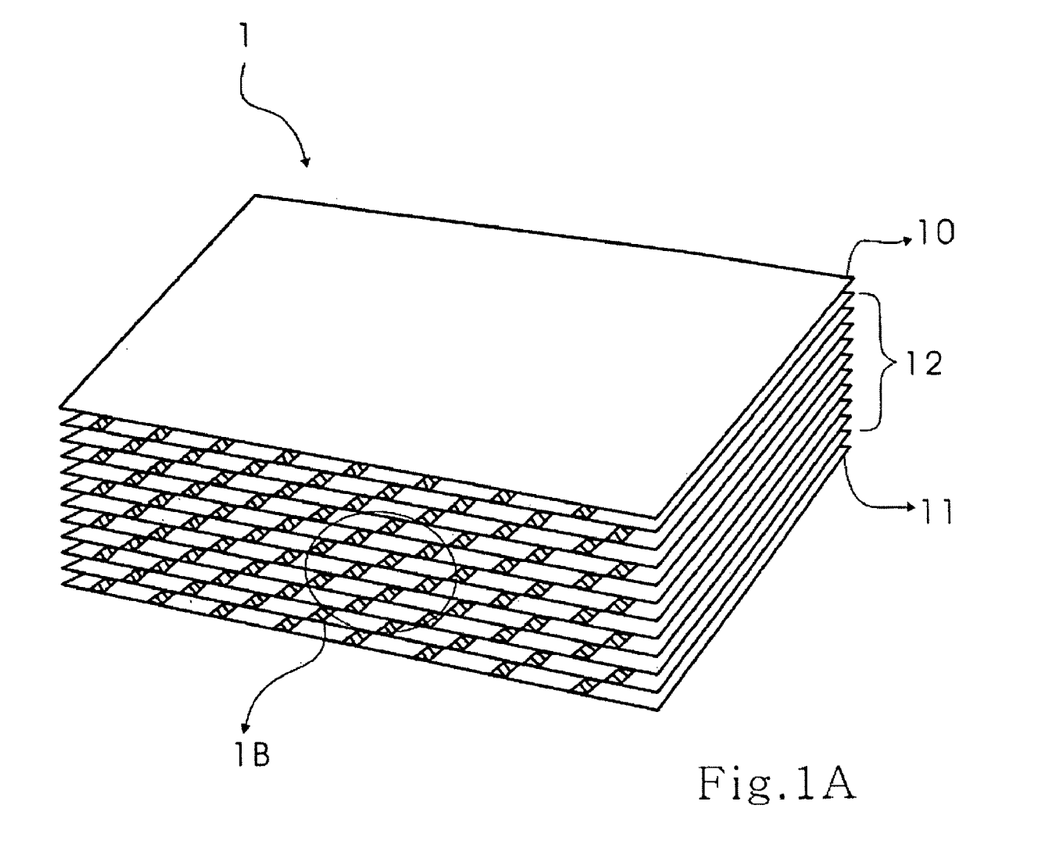
FIG. 1A is a schematic view showing the volume-adjustable unit of the present invention.
Figure 1B:
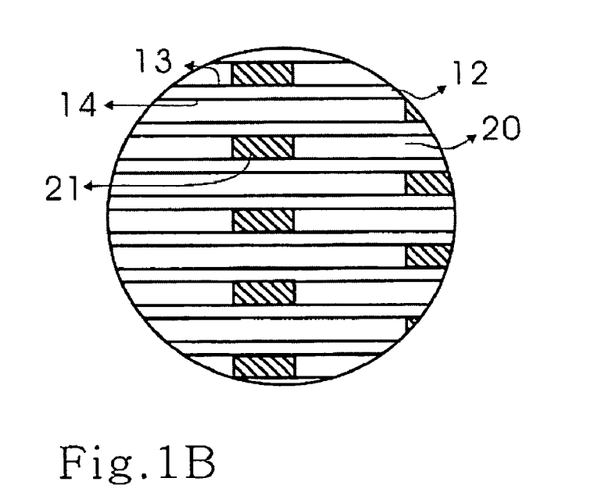
FIG. 1B shows an area of the right side view of the unit shown in FIG. 1A.
Figure 1C:
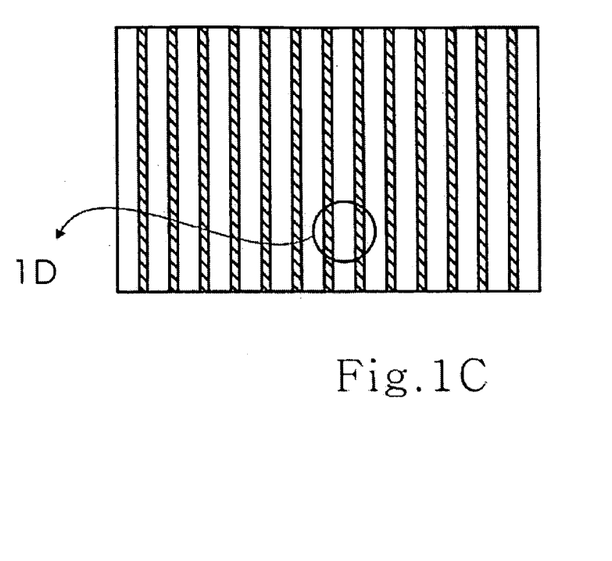
FIG. 1C shows a top plane view of an inner paper layer of the unit shown in FIG. 1A.

FIG. 1A is a schematic view showing a volume-adjustable unit 1 of the present invention. The unit 1 comprises a first layer 10, a second layer 11, and multiple inner paper layers 12 subsequently disposed between the first layer 10 and the second layer 11. As shown in FIG. 1B, representing an area of the right side view of the unit 1, each inner paper layer 12 has two opposing sides 13 and 14, and each of the opposing sides 13 and 14 is adhered to an adjacent layer of the inner paper layer 12 through an adhesive layer 20. As shown in FIG. 1C, representing a top plane view of an inner paper layer 12 of the unit 1 as well as an adhesive layer 20 above the inner paper layer 12, the adhesive layer 20 comprises multiple adhesive strips 21. The adhesive strips 21 of each adhesive layer 20 are formed subsequently, spaced apart from each other and substantially parallel. The expression "substantially parallel" means that, in an adhesive layer, the angle of an adhesive strip relative to any other adhesive strip is within 10%. The multiple adhesive strips 21 are arranged in such a way that each section of an inner paper layer 12 adheres to at most one adjacent layer on one of its opposing sides 13 and 14 through an adhesive strip 21. Because of the aforementioned unique arrangement of the inner paper layers 12, multiple hexagonal columns are formed by the inner paper layers 12 as unit 1 is stretched-out, and the volume of the unit 1 increases accordingly so as to provide a supporting surface with a desired area.

Figure 1D:
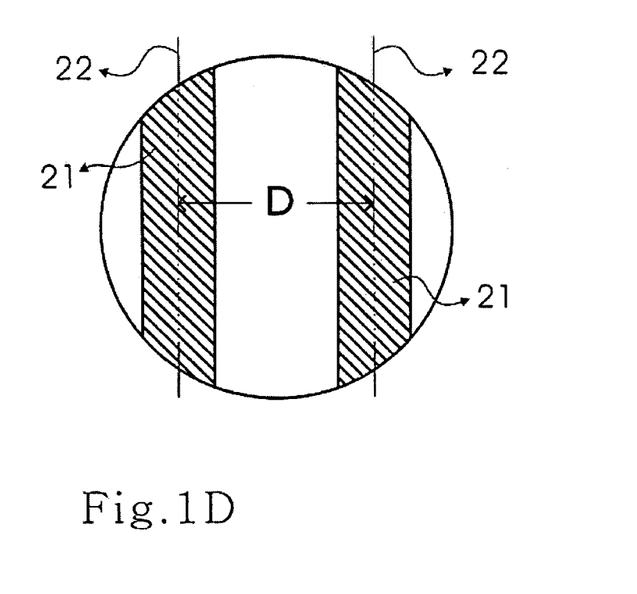
FIG. 1D shows an area of the top plane view of an inner paper layer shown in FIG. 1C.

FIG. 1D shows an area of the top plane view of FIG. 1C. As shown in FIG. 1D, each adhesive strip 21 has a central line 22. The distance (D) of any two adjacent central lines 22 on an adhesive layer 20 may be optionally adjusted. Preferably, the value of D ranges from 4 mm to 100 mm, and more preferably from 20 mm to 50 mm. It is preferred that the distance of any two adjacent central lines 22 is substantially identical, i.e., the difference between the largest distance of two adjacent central lines (DL) and the smallest distance of two adjacent central lines (DS) is within 10% of the largest distance (DL) [[(DL−DS)/DL]×100%≦10%]. The width of an adhesive strip 21 may also be optionally adjusted. However, since the volume adjustability of the unit 1 decreases with the increase of the width of adhesive strip 21, it is preferred that each of the multiple adhesive strips 21 of an adhesive layer 20 has a width ranging from 0.05 D to 0.55 D, more preferably from 0.1 D to 0.5 D.

The multiple inner paper layers 12 may be made of the same or different type of paper, and the paper may optionally have properties such as refractory, water-resistance, and/or weather-resistance. Any paper that can provide a unit with the desired flexibility as well as deformation resistance is suitable for the present invention. Suitable types of paper include, but not limited to, art paper, printing paper, wood free paper, film-coated paper, impression paper, impregnated insulation paper, bond paper, bond circular paper, book cover paper, book paper, liner board, corrugating medium, wrapping paper, coated white board, white board, chip board, base paper for asphalt roofing, plain copy paper, incombustible paper, inhibitive paper, and nanopaper. Any adhesives that can adhere two pieces of paper together are suitable for adhering the inner paper layers of the unit of the present invention to each other. For instance, a water-based adhesive, pressure sensitive adhesive or hot melt adhesive may be used in adhering inner paper layers. The multiple inner paper layers are adhered to each other by a water-based adhesive.

The weight of an inner paper layer 12 can optionally vary. However, if the inner paper layer 12 is too light, it may not provide a unit 1 with a sufficient supporting strength. On the other hand, if the inner paper layer 12 is too heavy, it may be difficult to stretch out the unit 1. Typically, the weight of an inner paper layer 12 ranges from 50 to 300 g/m2, preferably from 70 to 280 g/m2, and more preferably from 150 to 250 g/m2.

The first layer 10 and second layer 11 may be made of the same or different materials including, but not limited to, paper, plastics, woods, and metals, as long as thus prepared first layer 10 and second layer 11 will not deform during the stretching of the unit 1. If the first layer 10 and second layer 11 are made of paper, the type of paper may be the same as or different from the paper used to prepare the multiple inner layers 12; the weight of each of the first layer 10 and second layer 11 is at least 500 g/m$^2$, preferably at least 1000 g/m$^2$, and more preferably at least 2000 g/m$^2$. The adhesive used for adhering an inner paper 12 to the first layer 10 or the second layer 12 depends on the material of the first layer 10 or the second layer 12. For instance, if the first layer 10 and the second layer 11 are made of the same type of paper for preparing an inner paper layer 12, a water-based adhesive can be used for adhering an inner paper layer 12 to the first layer 10 or the second layer 11. If the first layer 10 or the second layer 11 is a cane fiber board, polyvinyl acetate can be used for adhering an inner paper layer to a cane fiber board used as the first layer 10 or the second layer 11. If the first layer 10 or the second layer 11 is a metallic board, polyvinyl acetate or polystyrene can be used for adhering an inner paper layer to a metallic board used as the first layer 10 or the second layer 11. And if the first layer 10 or the second layer 11 is a plastic board, polystyrene or a hot melt adhesive can be used for adhering an inner paper layer 12 to a plastic board used as the first layer 10 or the second layer 11.

Figure 2:
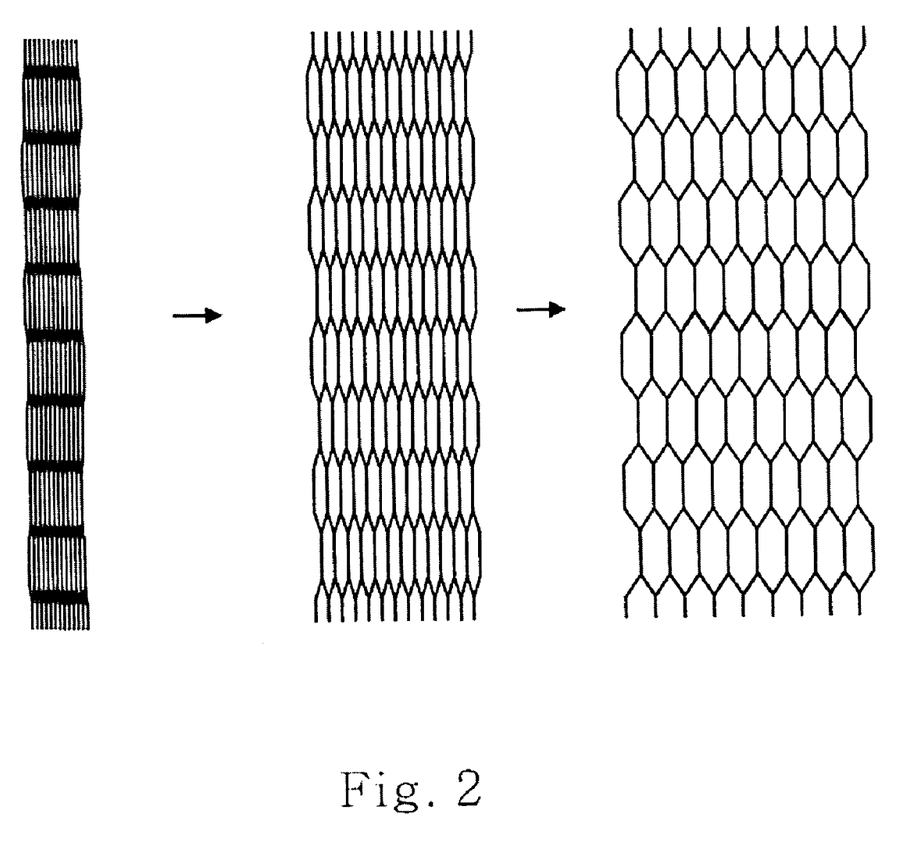
FIG. 2 is a schematic view showing the volume adjustment of the multiple inner paper layers of an embodiment of the unit of the present invention.

FIG. 2 is a schematic view showing the volume change of the multiple inner paper layers of an embodiment of the unit of the present invention before, during, and after the unit is stretched-out. As shown in FIG. 2, by stretching the unit of the present invention, the volume of the unit increases from its original state through a left to middle to right progression of the configurations, resulting in a volume much larger than that of the original state. Also, as the unit is stretched out, multiple hexagonal columns are formed so as to provide a structure which can sustain certain stress for a certain period without permanent deformation. The unit can be processed to provide a supporting structure for use as a frame of a piece of furniture. More inner paper layers can be disposed in the unit of the present invention to provide a supporting structure that has a supporting surface with more area.

Figure 3A:
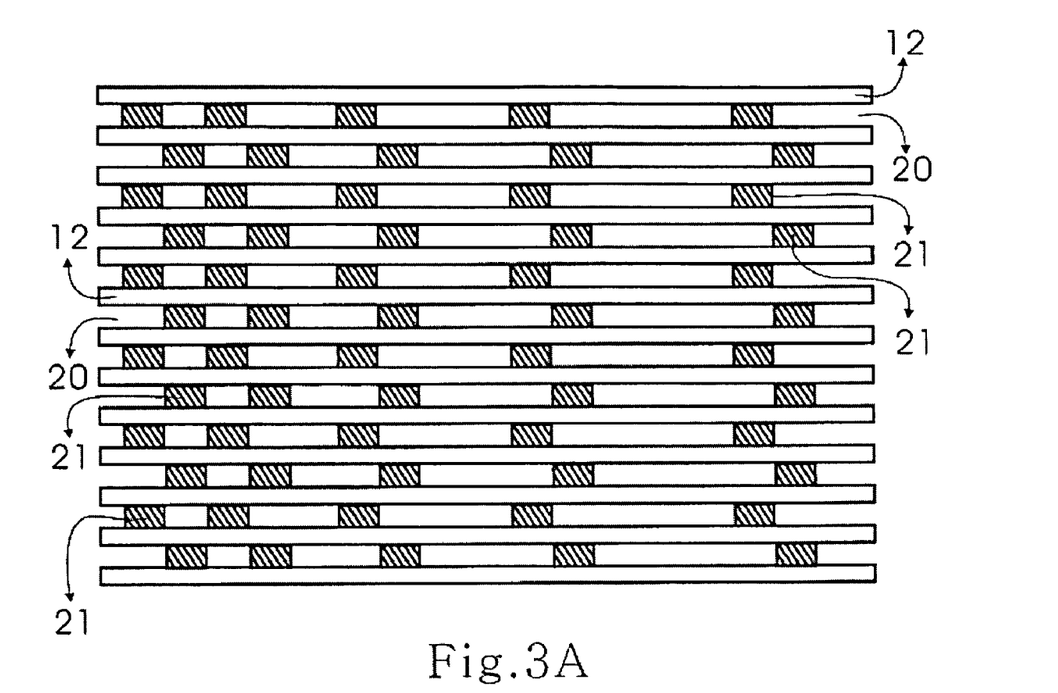
FIGS. 3A and 3B are schematic views showing different arrangements of the adhesive strips in the unit of the present invention.
Figure 3B:
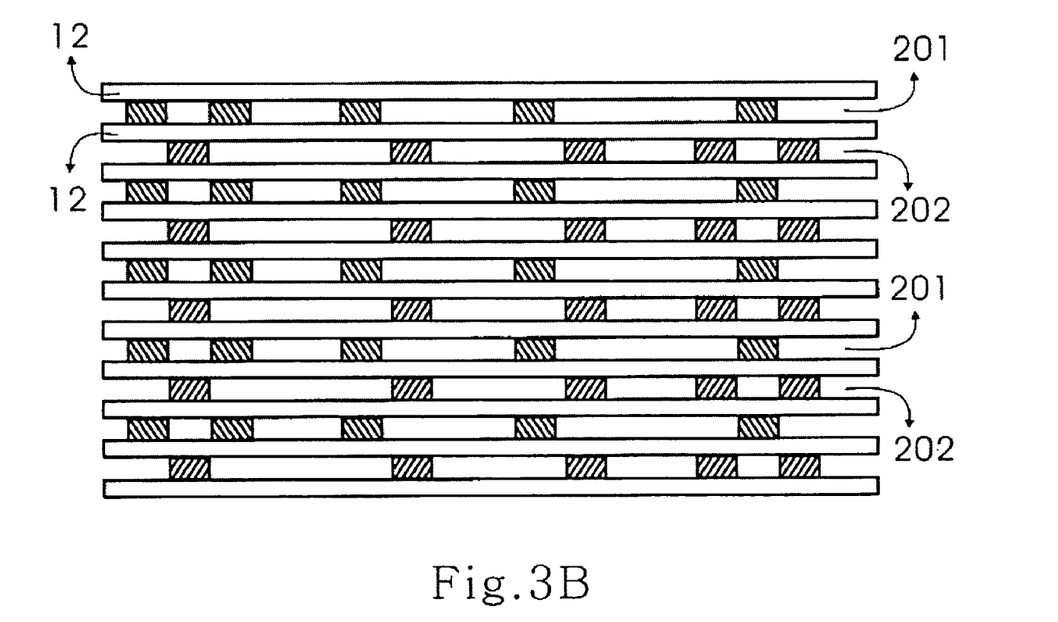

Again referring to FIG. 1A, the distance between any two adjacent central lines 22 (not shown) on each adhesive layer 20 is substantially identical and the width of each adhesive strip 21 of each adhesive layer 20 is substantially identical. However, the arrangement of the adhesive strips 21 of each adhesive layer 20 may optionally vary, as long as such variation does not significantly affect the balance of the unit 1 thus formed. FIGS. 3A and 3B show two alternative arrangements of the adhesive strips 21 in the unit of the present invention. In FIG. 3A, the distance between two adjacent central lines (not shown) on each adhesive layer 20 increases from out to out, i.e., increases from the left end to right end, and all adhesive strips 21 are of substantially the same width. In FIG. 3B, the distance between two adjacent central lines (not shown) on an odd adhesive layer 201 increases from the right end to the left end, while the distance between two adjacent central lines (not shown) on even adhesive layer 202 decreases from the right end to the left end.

The present invention also provides a piece of volume-adjustable furniture. The piece of furniture can be a table, desk, chair, stool, bed, shelf, cabinet, and the likes. The piece of furniture comprises a frame prepared by cutting the unit of the present invention into a desired shape. The frame thus prepared has an adjustable volume and can provide a supporting configuration with desired supporting surface by stretching out the frame. Depending on the target furniture, the number of inner paper layers in the unit may optionally vary. For instance, for the preparation of a frame of a table, desk, chair, or bed, it is preferred that the unit comprises at least 50, more preferably at least 120 inner paper layers. The furniture comprising such a volume-adjustable frame can be easily transported from one place to another place in its original form, i.e., the frame is in its un-stretched state. After being transported to its destination, the frame is stretched out to provide a supporting configuration with a desired supporting surface. The configuration of the frame can be adjusted to fit an available space. Furthermore, the frame made of the unit of the present invention has a desired deformation resistance so that even if the frame is used to serve a supporting function for a certain period of time, there is no permanent deformation of the frame and the frame can be reconfigured into another shape.

Figure 4A:
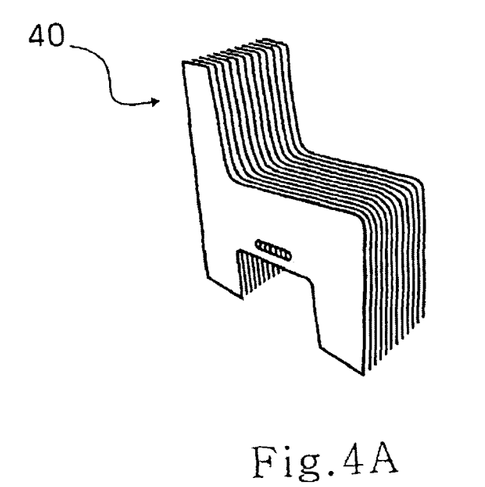
FIG. 4A is a schematic view showing a chair comprising a volume-adjustable frame made of the unit of the present invention, wherein the frame is in its original state.
Figure 4B:
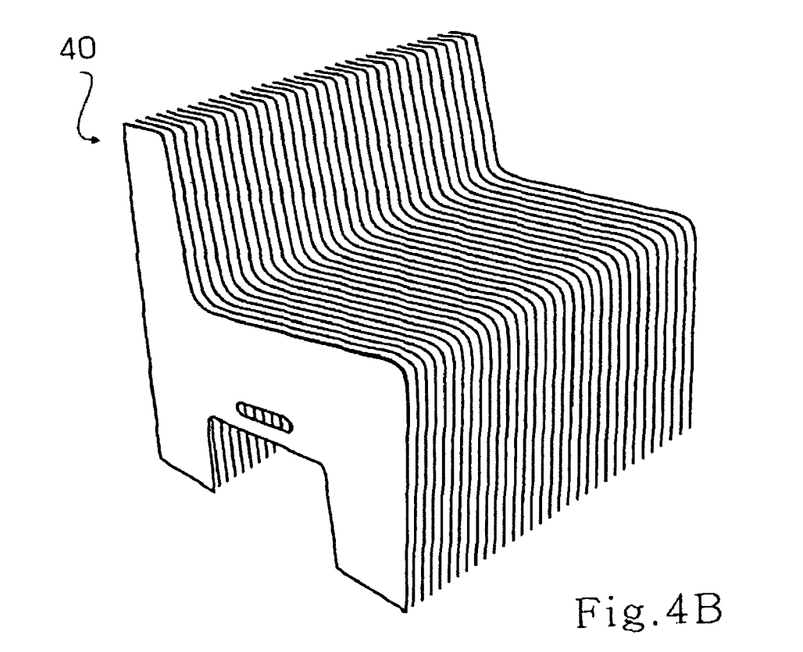
FIG. 4B is a schematic view showing a first stretched-out configuration of the chair shown in FIG. 4A.
Figure 4C:
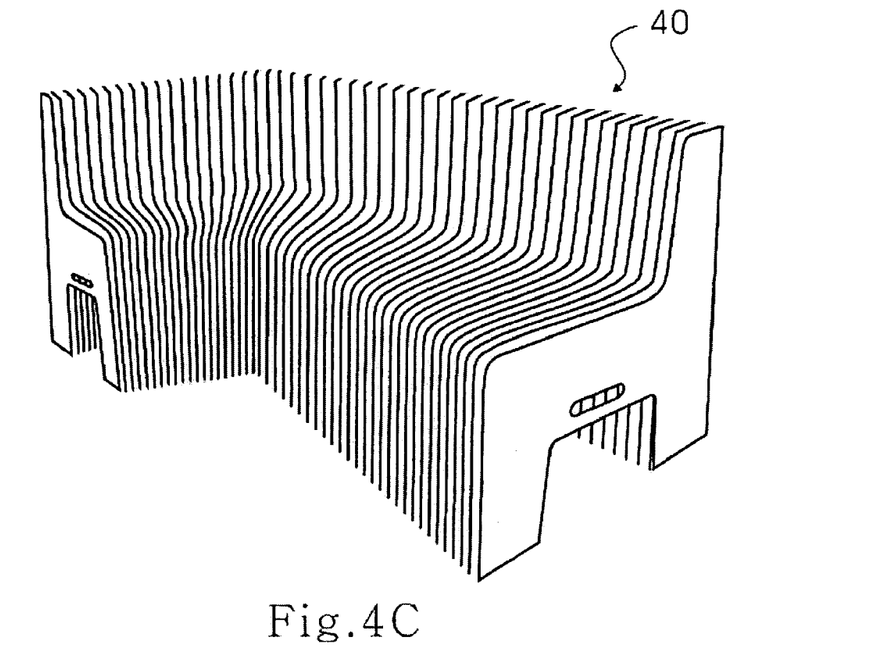
FIG. 4C is a schematic view showing a second stretched-out configuration of the chair shown in FIG. 4A.
Figure 4D:
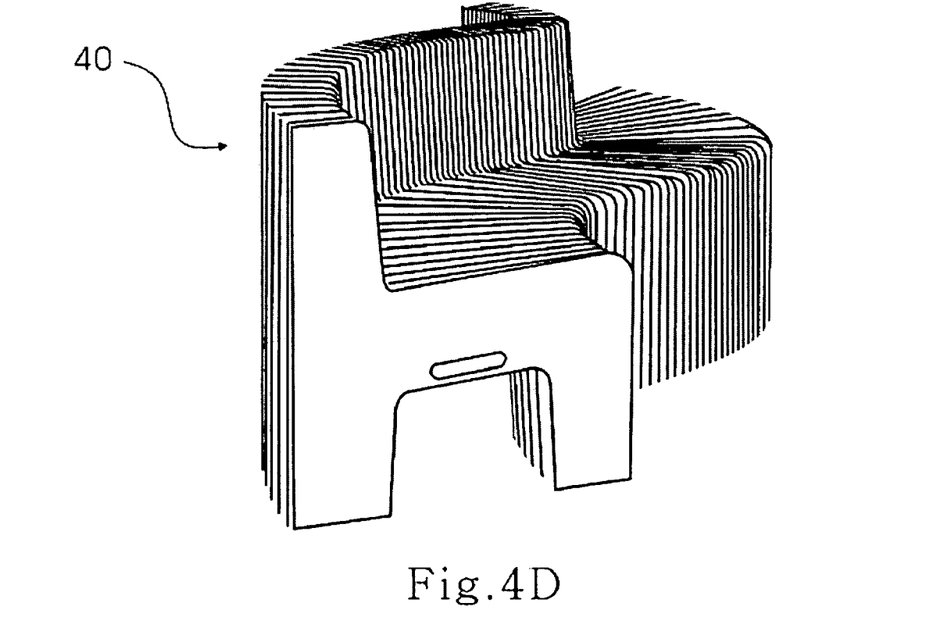
FIG. 4D is a schematic view showing a third stretched-out configuration of the chair shown in FIG. 4A.
Figure 4E:
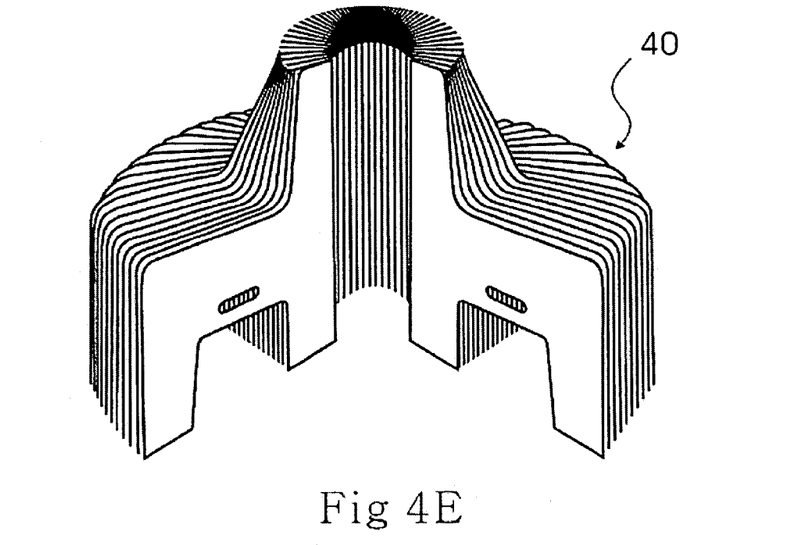
FIG. 4E is a schematic view showing a forth stretched-out configuration of the chair shown in FIG. 4A.
Figure 4F:
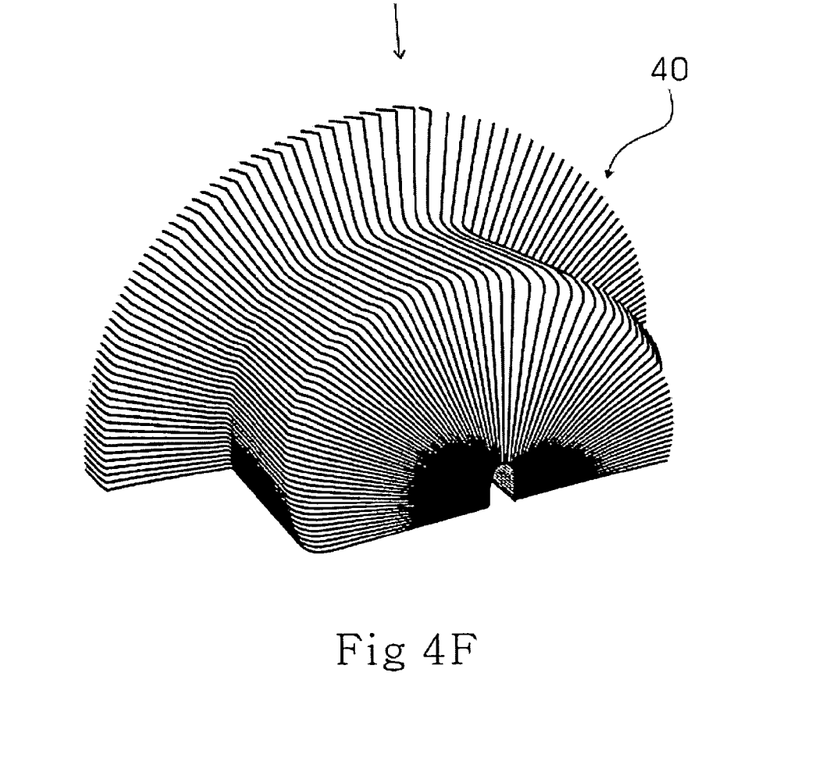
FIG. 4F is a schematic view showing a fifth stretched-out configuration of the chair shown in FIG. 4A.

Depending on the degree and way of stretching, the frame made of the unit of the present invention may have different configurations with different supporting shapes. FIG. 4A is a schematic view showing a chair comprising a volume-adjustable frame 40 made of the unit of the present invention. FIGS. 4B to 4F show five different stretched-out configurations of the chair of FIG. 4A. The frame is prepared by cutting a volume-adjustable unit of the present invention into a desired shape and then is used under its stretched state so as to provide more sitting area. Because of its volume adjustability and light weight, the chair can be easily transported from one place to another in its original form (i.e., in the un-stretched state) and then be used under its stretched state so as to provide a chair with a desired area for sitting. In the configuration shown in FIG. 4B, 4C, 4D or 4E, the multiple hexagonal columns formed in the frame under its stretched situation provide a desired supporting strength to serve the basic function of a frame of a chair. As for the configuration shown in FIG. 4F, in addition to the basic supporting function, the multiple hexagonal columns formed in the stretched frame further provide a cushion effect for a person sitting in the arrow direction upon the curved area of the frame of the chair.

Figure 5:
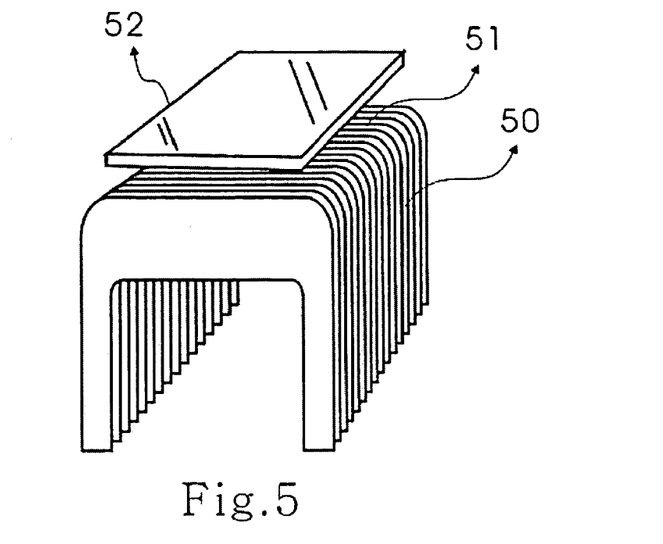
FIG. 5 is a schematic view showing a volume-adjustable table of the present invention comprising a volume-adjustable frame and a glass substrate for covering the tabletop.

FIG. 5 shows a volume-adjustable table comprising a frame 50 made of the unit of the present invention. The frame 40 is prepared by cutting a unit of the present invention into a desired shape, and is used in its stretched state so as to provide a tabletop 51 with a desired area. Optionally, the table may comprise a pad or a glass substrate 52 for protecting the tabletop 51 from contamination.

Figure 6:
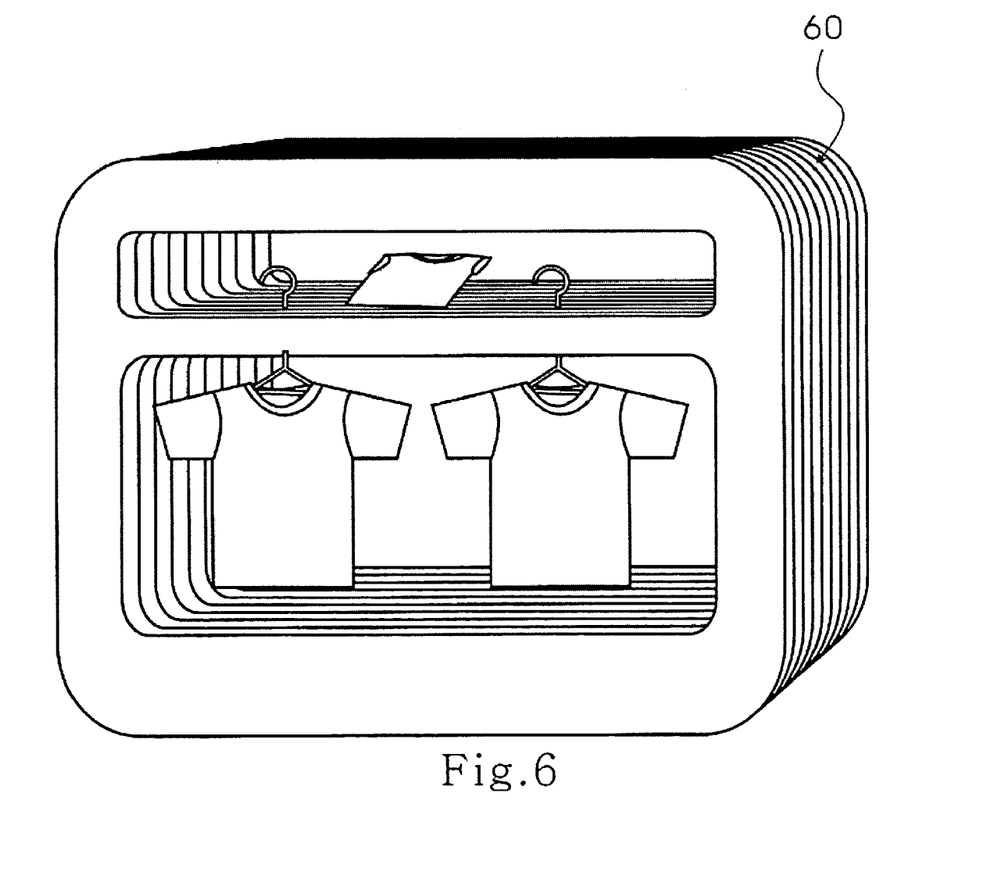
FIG. 6 is a schematic view showing a volume-adjustable displaying shelf of the present invention for displaying clothes.
Figure 7:
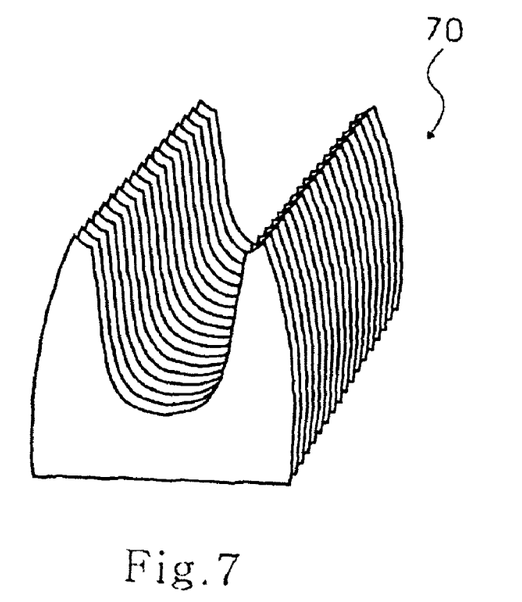
FIG. 7 is a schematic view showing a volume-adjustable magazine shelf of the present invention.
Figure 8:
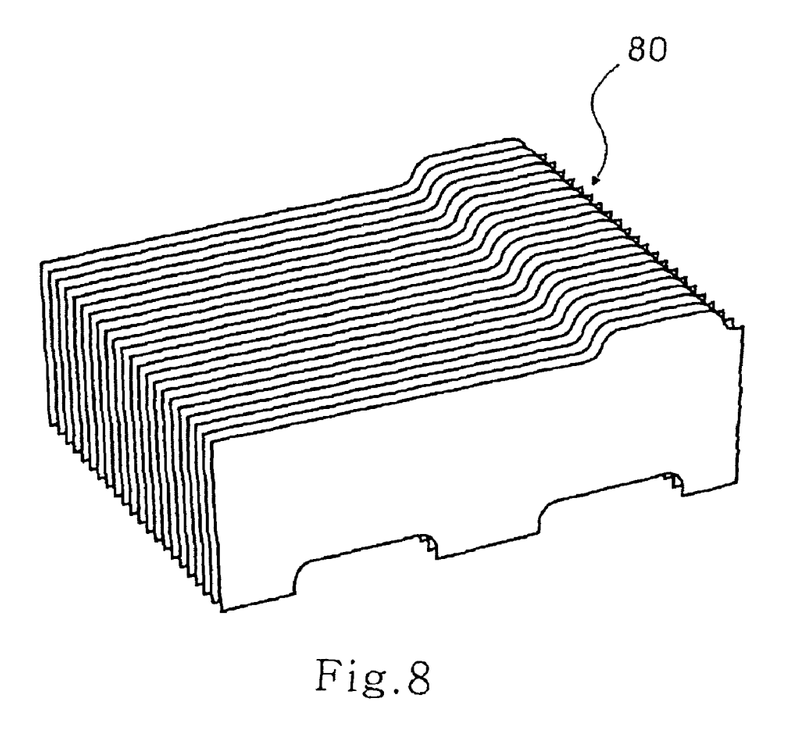
FIG. 8 is a schematic view showing a volume-adjustable bed of the present invention.
Figure 9A:
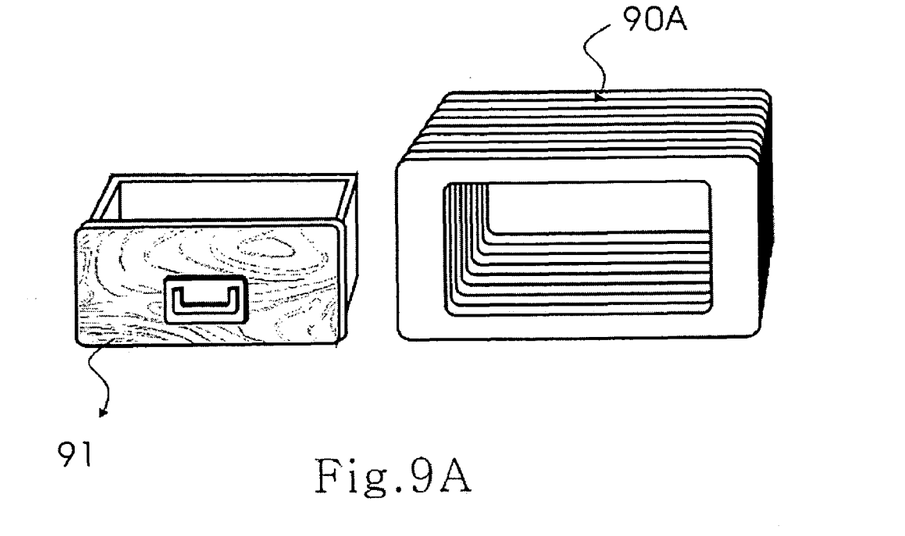
FIGS. 9A and 9B are schematic views showing two volume-adjustable cabinets of the present invention, wherein the cabinet comprises a volume-adjustable frame and a wooden or plastic drawer.
Figure 9B:
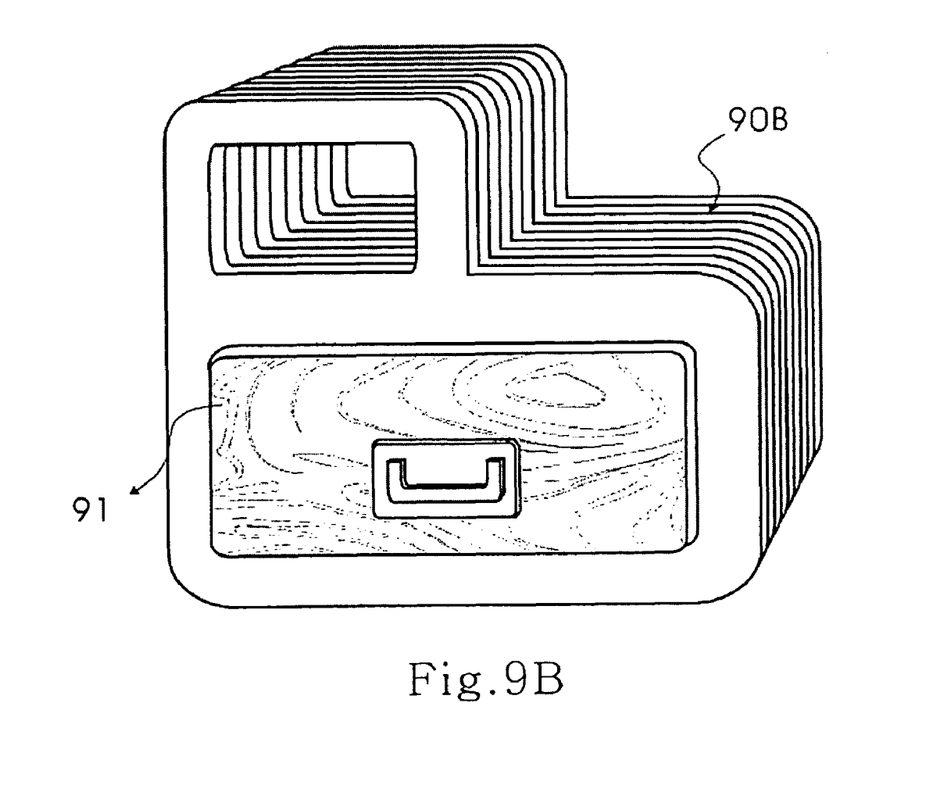

FIG. 6 shows a volume-adjustable displaying shelf for displaying clothes, comprising a frame 60 made of the unit of the present invention. The frame 60 is prepared by cutting a unit of the present invention into the desired shape and is used in its stretched state. Depending on the degree of stretching, the shelf can be easily transported from one place to another, and provides a displaying space meeting an available place. FIG. 7 shows a volume-adjustable magazine shelf comprising a frame 70 made of the unit of the present invention. The shelf has an adjustable holding capacity depending on the degree of stretching. FIG. 8 shows a volume-adjustable bed comprising a frame 80 made of the unit of the present invention. The frame 80 is prepared by cutting a unit of the present invention into a desired shape, and used in its stretched state to provide a desired sleeping surface. Optionally, the bed may further comprise a pad (not shown) for protecting the sleeping surface from contamination. FIGS. 9A and 9B show two types of volume-adjustable cabinets comprising frames 90A and 90B, respectively, made of the units of the present invention. Each of frames 90A and 90B is prepared by cutting a unit of the present invention into a desired shape, and used in its stretched state. The cabinet may further comprise a wooden or plastic drawer 91. The cabinet can be easily transported as frame 90A or 90B is in its un-stretched state.

Figures 10A, 10B:
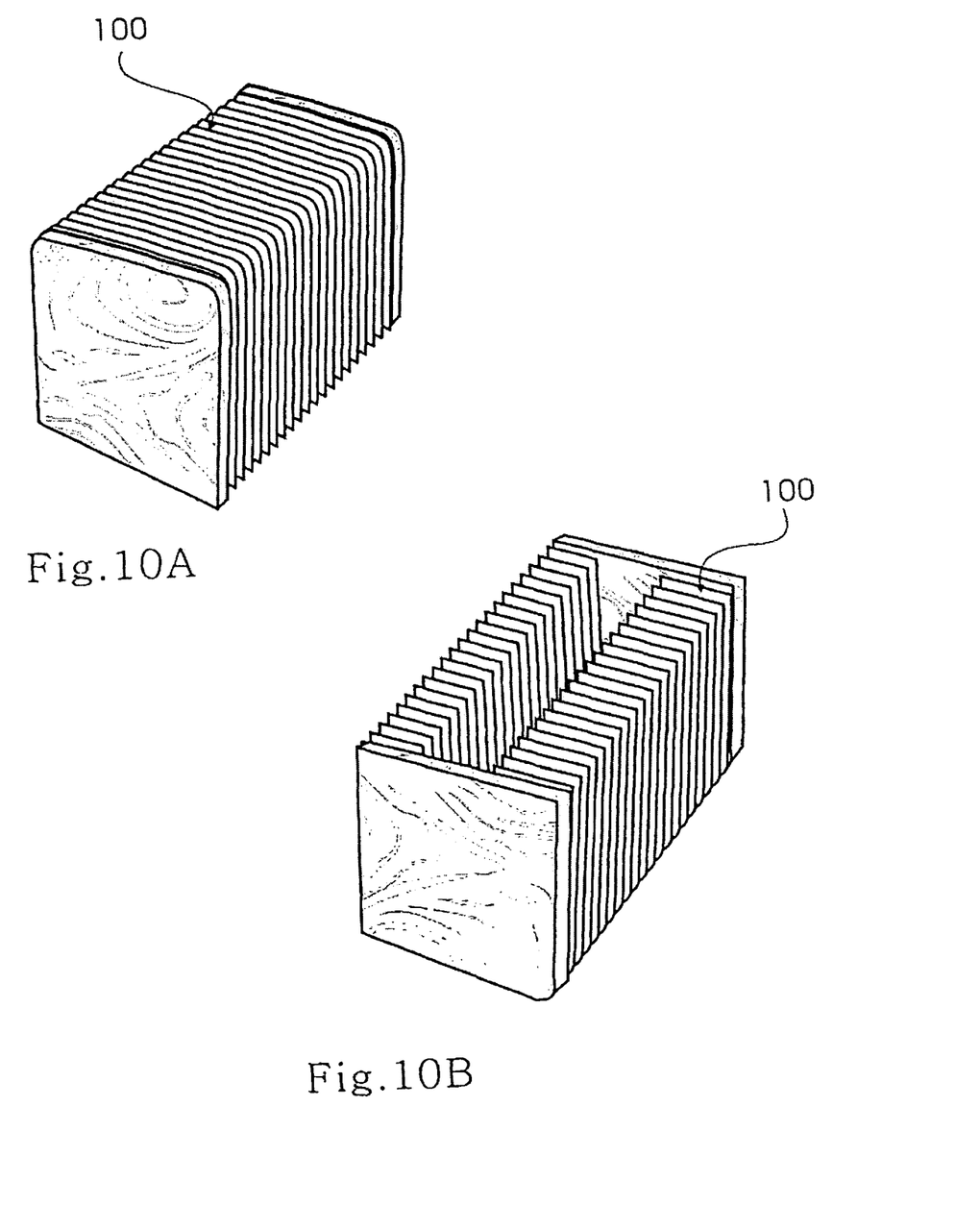
FIG. 10A is a schematic view showing a piece of volume-adjustable furniture of the present invention, wherein the furniture services as a stool.
FIG. 10B is a schematic view showing another function of the furniture shown in FIG. 10A; wherein the furniture services as a CD shelf by turning the stool of FIG. 10A upside down.

Depending on the design of the frame made of the unit of the present invention, the present invention also provides a piece of volume-adjustable furniture that serves more than one functions. FIG. 10A shows a volume-adjustable stool comprising a frame 10 made of the unit of the present invention. FIG. 10B shows a volume-adjustable CD shelf, by turning the stool of FIG. 10A upside down.

Optionally, the surface of the volume-adjustable frame made of the unit of the present invention can be processed to provide a desired appearance or pattern. As shown in FIG. 10, both of the out layers of the frame are processed to provide an attractive appearance, or a colored pattern thereon.

As disclosed above, the present invention provides a unit that is light and volume-adjustable and can be processed to provide a frame of a piece of furniture, so that the piece of the furniture is volume-adjustable, relatively light, and sufficient in supporting strength. The configuration of the furniture can be changed as desired, and the furniture can be transported from one place to another without taking up a lot of space.

The above disclosure is related to the detailed technical contents and inventive features thereof. People skilled in this field may proceed with a variety of modifications and replacements based on the disclosures and suggestions of the invention as described without departing from the characteristics thereof. Nevertheless, although such modifications and replacements are not fully disclosed in the above descriptions, they have substantially been covered in the following claims as appended.

What is claimed is:

1. A piece of furniture comprising a volume-adjustable frame made of a volume-adjustable unit, wherein the volume-adjustable unit comprises a first layer, a second layer, and multiple inner paper layers disposed between the first and second layers, each inner paper layer has two opposing sides, and each of the two opposing sides is adhered to an adjacent layer of the each inner paper layer through an adhesive layer, the adhesive layer comprises multiple adhesive strips, wherein the multiple adhesive strips are spaced apart from each other, are substantially parallel and are arranged in such a way that each section of the each inner paper layer adheres to at most one adjacent layer on one of the two opposing sides through an adhesive strip, whereby multiple hexagonal columns are formed by the inner paper layers as the unit is stretched out, wherein the volume-adjustable unit can be stretched out such that the overall size and shape of the piece of furniture can be reconfigured and can be returned to its non-stretched state without permanent deformation.

2. The furniture of claim 1, wherein the piece of furniture is selected from a group consisting of a chair, a table, a desk, a bed, a cabinet, a bookcase, and a shelf.

3. The furniture of claim 1, wherein the frame comprises a supporting surface, and the piece of furniture further comprises a pad for protecting the supporting surface from contamination.

4. The furniture of claim 2, wherein the piece of furniture is a cabinet and further comprises at least one drawer made of a material selected from the group consisting of wood and plastics.

5. The furniture of claim 1, wherein the frame comprises a shelf.

6. The furniture of claim 5, wherein the shelf comprises a display shelf.

7. The furniture of claim 6, wherein the display shelf is configured to display clothes.

8. The furniture of claim 1, wherein each of the multiple adhesive strips of an adhesive layer has a central line and the distance (D) between two adjacent central lines on an adhesive layer is from 4 mm to 100 mm, and each of the multiple adhesive strips of an adhesive layer has a width ranging from 0.05 D to 0.55 D.

9. The furniture of claim 8, wherein the distance on each adhesive layer is substantially identical, and the width of each adhesive strip of each adhesive layer is substantially identical.

10. The furniture of claim 1, wherein the multiple inner paper layers are made of a type of paper selected from the group consisting of art paper, printing paper, wood free paper, film-coated paper, impression paper, impregnated insulation paper, bond paper, bond circular paper, book cover paper, book paper, liner board, corrugating medium, wrapping paper, coated white board, white board, chip board, base paper for asphalt roofing, plain paper copy, incombustible paper, inhibitive paper, and nanopaper.

11. The furniture of claim 10, wherein the weight of each of the multiple inner layers is from 50 to 300 $g/m^2$.

12. The furniture of claim 1, wherein the first and second layers are made of a material selected from the group consisting of paper, wood, plastics, and metals.

13. The furniture of claim 12, wherein the first and second layers are made of paper with a type identical to that of the multiple inner paper layers, the weight of each of the multiple inner layers is from 50 to 300 $g/m^2$, and the weight of each of the first layer and the second layer is at least 500 $g/m^2$.

14. The furniture of claim 1, wherein the unit comprises at least 120 inner paper layers.

* * * * *